Nov. 13, 1945.  D. L. WOOD  2,388,893
LENS
Original Filed July 25, 1939
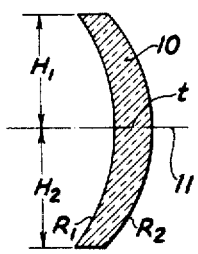
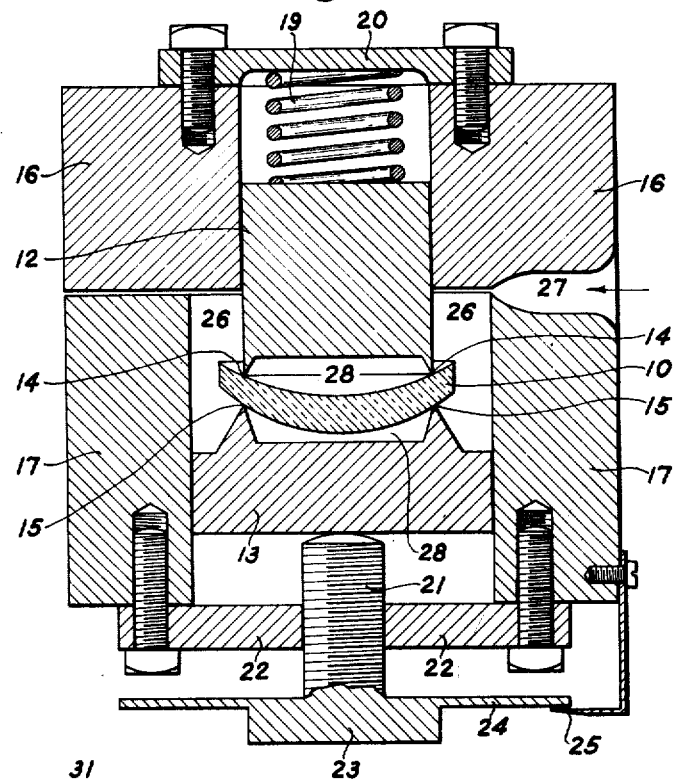
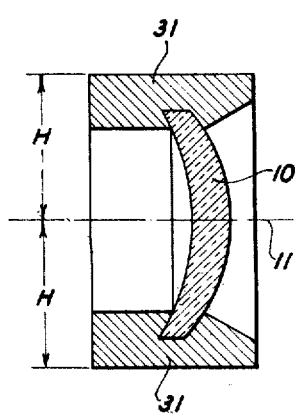
Donald L. Wood
INVENTOR
BY
ATTY. & AGT.

Patented Nov. 13, 1945

2,388,893

UNITED STATES PATENT OFFICE 2,388,893

LENS

Donald L. Wood, Rochester, N. Y., assignor to Eastman Kodak Company, Rochester, N. Y., a corporation of New Jersey Original application July 25, 1939, Serial No. 286,386. Divided and this application June 25, 1942, Serial No. 448,368

3 Claims. (Cl. 88—57)

This invention relates to optical systems and particularly to methods of mounting lenses.

This is a division of my application Serial No. 286,386, filed July 25, 1939, which has become U. S. Patent No. 2,304,984, dated December 15, 1942.

It is an object of the invention to provide an inexpensive method of mounting lenses, particularly simple lens elements or simple achromats. This divisional application relates specifically to the novel resulting product of that method.

One of the necessary steps in mounting a lens or a lens element is that of "centering" for which the accepted definition is "grinding the periphery of a lens or mirror to make its optical center coincide with its geometrical center." It is the primary object of the present invention to provide a method of and apparatus for centering a lens.

The long established procedure for centering a lens, namely grinding it in a lathe is expensive and in some cases is subject to error due to the difficulty of properly aligning the lens in the lathe under sufficient pressure to withstand the grinding action. The object of the present invention is to provide a way of centering a lens inexpensively and accurately.

According to the invention, a lens such as a single lens element may be optically centered inexpensively and accurately by clamping the lens in a mold with its optic axis centered in the mold and then molding a plastic rim onto the periphery of the lens (which periphery may or may not be centered on the optic axis) with the periphery of the rim centered on the optic axis of the lens. During all subsequent operations or applications to which the lens is put, it can be handled in the same manner as the lens which is centered by grinding and has the additional advantage of having a plastic rim which may have any predetermined outline and shape according to the mold used.

The periphery of the lens and/or of the rim may be any shape which has a center, such as a circle, an ellipse, a square, a rectangle, or even a triangle, although the commonest forms are of course a circle and a rectangle.

The preferable method of holding the lens in optical alignment in the mold is to clamp it with zonal clamp members from opposite sides with substantially no friction, in accordance with the invention of Arthur B. Simmons described in U. S. Patent 2,259,006. A zone of a lens surface is any portion equidistant from the optic axis and hence a zonal clamp may be formed by a pair of rings pressing on opposite sides of the lens preferably but not necessarily directly opposite to each other. Instead of a zonal clamp, one which covers all of the lens except that near the periphery may be used, but it is more difficult to make such clamps without considerable friction in their grip and they must match the curvature of the lens surface accurately whereas zonal clamps fit any and all lens surfaces (including aspherical ones but not including cylindrical or other surfaces which are not surfaces of revolution about the optic axis).

With a zonal clamp, the difference in thickness of any lens between its paraxial and marginal zones will, as the clamp is applied, cause the lens to slide to the position wherein its optic axis is centered in the clamp. Even a one dioptre spectacle lens which, of course, has very little differential in thickness over its area, will repeatedly center itself in a zonal clamp within one-thousandth of an inch. The development of zonal clamps is not part of the present invention, but is the invention of A. B. Simmons mentioned above. It is, of course, possible to vibrate or rotate the zonal clamp members to reduce the effect of the slight friction which does exist, but in general this has proven to be quite unnecessary.

The present invention is extremely useful along with those described in Patents 2,266,169 and 2,245,257 to Crumrine.

Other objects and advantages of the present invention will be more fully understood from the following description when read in connection with the accompanying drawing in which:

Fig. 1 shows the cross section of a simple uncentered lens element.

Fig. 2 illustrates one embodiment of the invention.

Fig. 3 illustrates a lens centered according to the invention.

In Fig. 1 a simple lens element 10 which may be of glass or of plastic, which may be molded or ground in the usual way to have surfaces R1 and R2 which are curved, but which is not centered, has its optic axis 11 running through a point which is not coincident with the geometrical center of this element 10. That is, in general the geometrical center of the element 10 does not coincide with the optic axis 11, but of course, some samples of any particular run of lenses may be optically centered and require only to be checked in this respect. The optical center of a lens is of course the point at which it is thickest or thinnest depending on whether it is a positive or a negative element. The axial thickness of the element 10 is indicated by the letter $t$. The periphery of the lens 10 is not centered on the optic axis 11 as is indicated by the letters H1 and H2, where H1 is in general not equal to H2. The present invention centers this lens, that is, makes its optic axis coincide with its geometrical center.

The embodiment of the invention shown in Fig. 2 illustrates one method of applying the present invention. In this arrangement, the lens element 10 is held by zonal clamp members 14 and 15 in a molding machine consisting of an upper mold 16 and a lower mold 17. The zonal clamp member 14 is formed by a ring on the end of a piston 12 carried by the upper mold 16 which piston 12 is forced downward by a spring 19 which is held by a plate 20 rigidly carried by the mold 16. Similarly the zonal clamp member 15 is carried by a piston 13 moving in a cylinder in the lower clamp 17.

The position of the piston 13 carrying the zonal clamp member 15 may be adjusted relative to the mold 17 by an adjustment screw 21 having a knob 23 mounted thereon and carried by a plate 22 rigidly secured to the mold 17. The knob 23 is provided with a scale 24 and index 25 to indicate this adjustment.

Thus, according to the present invention, the lens element 10 is held by a zonal clamp consisting of members 14 and 15 which are preferably opposite to each other in a plastic molding device. While it is held in this position a suitable plastic is inserted under pressure through an injection orifice 27 into a chamber 26 and forms a rim on the lens 10. This rim 31 is best seen in Fig. 3. The zonal clamp members 14 and 15 prevent any of the plastic entering the chambers 28 on opposite sides of the lens and hence only the periphery of the lens comes in contact with the plastic.

In general, it is best to have the zonal clamp members 14 and 15 come exactly opposite each other or have the member 14 slightly smaller in diameter than the member 15, since otherwise there would be a slight component of the injection pressure acting upward on the lens element 10 acting against the force of the spring 19. When the clamp members are arranged in this manner, i. e., directly opposite to each other or with the member 14 smaller in diameter than the member 15 the spring 19 is relieved of any pressure due to that under which the plastic is inserted through the entrance nozzle 27. If this were not the case, an extremely strong spring would have to be used at the point 19 since most plastics are injected under very high pressures.

The zonal clamp members 14 and 15 have substantially no friction and thus the lens element 10 moves automatically as the clamps are applied to the position in which its optic axis is centered in the zonal clamp members 14 and 15. I have discovered that even very weak lenses accurately center themselves in a zonal clamp. The chamber 26 is arranged so that its outer surface, i. e., the cylinder in the mold 17 is concentric with the zonal clamp members 14 and 15 and thus the outer periphery of the mold 31 (see Fig. 3) is automatically centered on the optic axis 11 of the element 10.

In Fig. 3 this centering is indicated by the fact that the semi-diameter of the lens in its mount is indicated by H, which semi-diameter is the same independent of the direction in which it is measured.

Obviously the invention is equally applicable to all lenses either positive or negative, compound or simple. Although I prefer to use zonal clamps, any method of holding the lens optically centered in the molding device is perfectly satisfactory as far as the present invention is concerned. Furthermore any type of plastic molding machine or any type of plastic may be used, the apparatus shown in the accompanying drawing being merely by way of illustration. Of course, Fig. 2 illustrates only part of the usual molding machine, i. e., illustrates the dies themselves, but machines for holding such dies are well known and need not be illustrated here. Also practically all molding machines are arranged so that several units are molded simultaneously and in actual practice several sets of dies similar to Fig. 2 are operated simultaneously. Of course each chamber is, according to the invention, provided with a means for holding the lens optically centered in its own mold.

Having thus described one embodiment of my invention, I wish to point out that it is not limited to the specific structure shown but is of the scope of the appended claims.

What I claim and desire to secure by Letters Patent of the United States is:

1. An optically centered objective comprising an uncentered glass lens whose geometrical center is spaced from its optic axis so that the radius of the lens measured from the optic axis to the edge varies, and a plastic rim molded around the edge thereof with the periphery of the rim circular and centered on the optic axis of the lens, the thickness of the rim of plastic material between the periphery of the glass lens and the rim periphery measured radially with respect to the optic axis of the lens, being complementary to said radius of the lens at every point of the periphery to compensate for the uncenteredness of the lens.

2. An optically centered objective comprising an uncentered glass lens whose geometrical center is spaced from its optic axis so that the radius of the lens measured from the optic axis to the edge varies, and a plastic rim molded around the edge thereof with the periphery of the rim circular and molded centered on the optic axis of the lens, the thickness of the rim of plastic material between the periphery of the glass lens and the rim periphery measured radially with respect to the optic axis of the lens, being complementary to said radius of the lens at every point of the periphery to compensate for the uncenteredness of the lens.

3. An optically centered objective comprising an uncentered glass lens whose geometrical center is spaced from its optic axis so that the radius of the lens measured from the optic axis to the edge varies, and a plastic rim molded around the edge thereof with the periphery of the rim circular and centered on the optic axis of the lens and with the periphery of the lens embedded in the plastic rim, the thickness of the rim of plastic material between the periphery of the glass lens and the rim periphery measured radially with respect to the optic axis of the lens, being complementary to said radius of the lens at every point of the periphery to compensate for the uncenteredness of the lens.

DONALD L. WOOD.